N. G. WARTH.
INNER TUBE FOR PNEUMATIC TIRES.
APPLICATION FILED FEB. 19, 1920.
1,410,630. Patented Mar. 28, 1922.
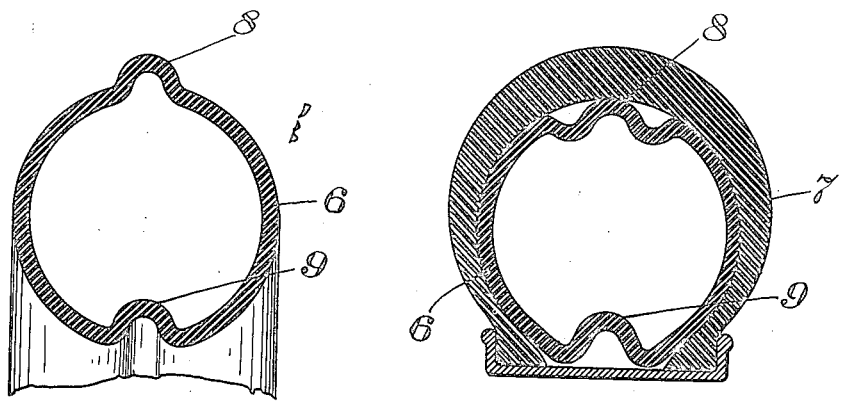
Fig.1. Fig.2.
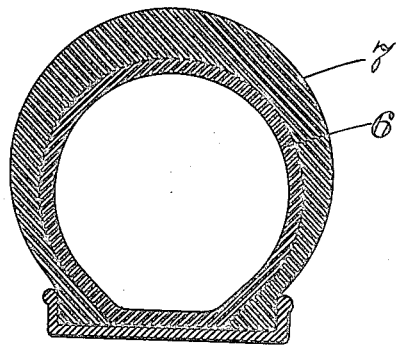
Fig.3.
Inventor
Nathaniel G. Warth
his Attorneys

UNITED STATES PATENT OFFICE.

NATHANIEL G. WARTH, OF GALLIPOLIS, OHIO.

INNER TUBE FOR PNEUMATIC TIRES.

1,410,630.

Specification of Letters Patent. Patented Mar. 28, 1922.

Application filed February 19, 1920. Serial No. 360,010.

*To all whom it may concern:*

Be it known that I, NATHANIEL G. WARTH, a citizen of the United States, residing at Gallipolis, in the county of Gallia and State of Ohio, have invented a certain new and useful Improvement in Inner Tubes for Pneumatic Tires, of which the following is a specification.

The object of this invention is to provide an improved form of inner tube for a pneumatic tire adapted to mitigate the evils of puncturing.

The invention is embodied in the example herein shown and described, the features of novelty being finally claimed.

In the accompanying drawing—

Figure 1 is a cross section of the tube according to the invention.

Fig. 2 is a similar section illustrating the same lodged in a tire casing but before inflation.

Fig. 3 is a view like Fig. 2 showing the tube inflated.

In the views 6 designates the inner tube. Such tube is formed of soft rubber in a circular vulcanizing mold and without joints or seams and so that it comes from the mold round and circular in form conforming generally and normally circumferentially to the cavity of the casing.

The tube is also provided with the usual valve stem (not shown) for inflating it, said stem having a suitable reinforcing mounting placed in the tube prior to the process of vulcanizing it.

The tube at its tread or outer side is molded with a circumferential outward protrusion 8 of substantially the same thickness as the rest of the tube but formed upon a curve of smaller radius than the major radius of the cross section of the tube or so as to contain more rubber than if the protrusion were made on the radius of the cross section of the tube while the tube at its inner or rim side is made with a circumferential inward depression 9 of substantially the same thickness as the rest of the tube but formed upon a curve of smaller radius than that of the cross section of the tube or so as to contain more rubber at its region than if made on the aforesaid radius of the tube. The tube is made in its major portion to fit closely in the casing 7 when in uninflated condition or as shown in Fig. 2. Hence when such a tube is inflated against the resisting walls of the casing and wheel rim the puckered portions of the tube are forced outward into coincidence with the cavity formed by the casing and rim as shown in Fig. 3 thereby condensing the rubber in those regions.

Regarding the cooperation of the circumferential protrusion and depression it may be observed that when the tube is inserted in the casing and inflated the outer or tread protrusion is condensed in both the crosswise and circumferential directions while the depression at the rim side is similarly condensed both transversely and circumferentially. This condensation and distension however are interdistributed with the result that a condensation of the rubber at the tread side takes place endowing it with a greater tendency to close tightly around the puncturing thing or to close an opening in the rubber left thereby. The circumferential depression and protrusion promote facility of compression of the tube for insertion into the casing.

The forms and proportions of the parts can be varied in some degree without departing from the gist of the invention as claimed.

What I claim is:

1. An inner inflatable tube of soft rubber for a pneumatic tire having a circumferential protrusion at its tread side and a circumferential depression at its inner or rim side.

2. An inner inflatable tube of soft rubber for a pneumatic tire having a circumferential protrusion at its tread side and a circumferential depression at its inner or rim side, the walls forming said depression and protrusion being of substantially the same thickness as the wall forming the body of the tube.

NATHANIEL G. WARTH.